United States Patent [19]

Rettberg

[11] 4,243,157
[45] Jan. 6, 1981

[54] ADJUSTABLE POURING DISPENSER
[75] Inventor: Leonard W. Rettberg, Linesville, Pa.
[73] Assignee: Interproduct B.V., Driebergen, Netherlands
[21] Appl. No.: 49,978
[22] Filed: Jun. 19, 1979
[51] Int. Cl.³ .......................................... B65D 25/48
[52] U.S. Cl. ................................. 222/44; 222/500
[58] Field of Search ................................ 222/41–44, 222/304, 307, 437, 438, 440, 482, 500

[56] References Cited
U.S. PATENT DOCUMENTS

| | | | |
|---|---|---|---|
| 1,724,766 | 8/1929 | McCauley | 222/43 |
| 2,825,494 | 3/1958 | Belshaw | 222/440 |
| 2,968,423 | 1/1961 | Mahler et al. | 222/482 X |
| 3,101,751 | 8/1968 | Ballin | 222/43 X |
| 3,233,797 | 2/1966 | Conry | 222/500 X |
| 3,321,113 | 5/1967 | Conry | 222/500 X |
| 3,543,964 | 12/1970 | Schlossmacker | 222/41 |

Primary Examiner—David A. Scherbel
Attorney, Agent, or Firm—Haseltine and Lake

[57] ABSTRACT

An adjustable pouring dispenser to be placed in the neck of a bottle for dispensing a controlled amount of liquid therefrom is disclosed as including a cylindrical chamber having a closed lower end with an aperture therein to control the rate of descent of a ball in the chamber when the bottle is inverted. Ports in the wall of the chamber allow liquid to flow out of the bottle through a rotatable spout until the ball cuts off flow by coming to rest on a conical seat. The ports are adjustably obstructed thereby controlling the amount of liquid dispensed, by aligning a vane on the spout with one of several indices provided on the body.

1 Claim, 8 Drawing Figures

U.S. Patent                Jan. 6, 1981                4,243,157
FIG.1
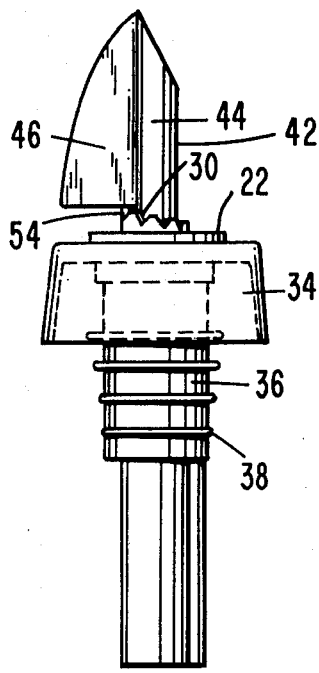
FIG.2
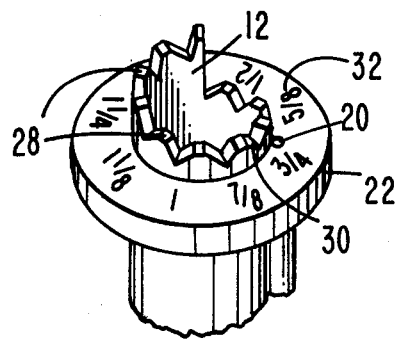
FIG.3
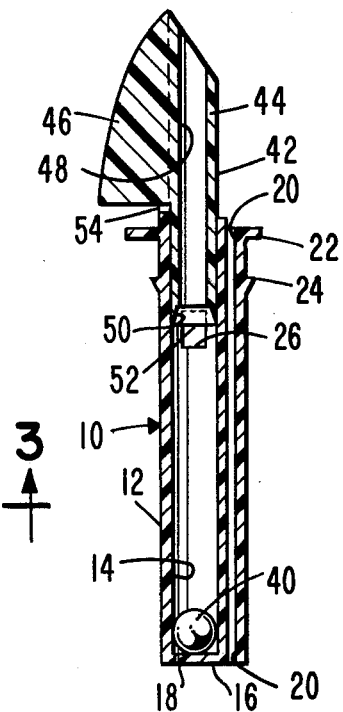
FIG.6
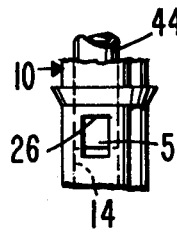
FIG.7
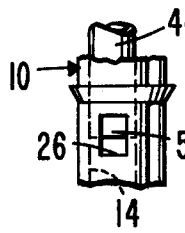
FIG.8
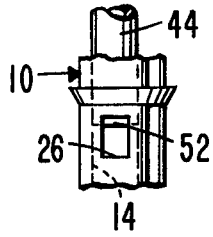
FIG.4
FIG.5
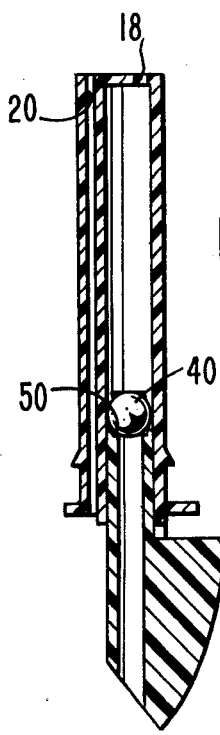

ADJUSTABLE POURING DISPENSER

BACKGROUND OF THE INVENTION

1. Field of the Invention

This invention relates to a device for dispensing an adjustably controlled volume of liquid from a bottle.

2. Description of the Prior Art

The prior art, as best exemplified by U.S. Pat. Nos. 2,368,540, 3,221,113 and 2,968,423, discloses a number of devices to be placed in the neck of a bottle to dispense controlled volumes of liquid therefrom. U.S. Pat. No. 2,368,540 discloses a device wherein a ball moving within a cylinder allows liquid to flow from a bottle for a set time, the quantity dispensed being controlled by adjusting an air vent screw. In U.S. Pat. No. 3,321,113, liquid in a fully vented bottle flows through a port of fixed size for a time that is controlled by varying the speed of travel of a ball in a chamber to a seated position. U.S. Pat. No. 2,968,423 discloses an adjustable pouring spout in which, while a ball falls at a nonadjustable rate in a chamber, liquid flows through chamber wall ports that are adjustably obstructed by a spout that is turned to move it into or out of the chamber.

Prior art devices that include means for adjusting flow suffer various drawbacks. In the U.S. Pat. No. 3,321,113, for example, the pourer must be removed from the bottle neck for adjustment. In the U.S. Pat. No. 2,968,423, no means are provided either to visually indicate the dispensing volume at a particular setting or to adjust in volumetric increments the dispensing volume.

An object of the present invention is to provide an adjustable pourer having a falling ball valve and an adjustable flow restriction to enable one to dispense repeated fixed quantities of liquid.

Another object is to provide an externally adjustable pourer with a rotatable spout having a vane or pointer overlying easily read indices to indicate clearly the dispensing volume.

STATEMENT OF THE INVENTION

The present invention is embodied in an adjustable pouring dispenser including a housing having a cylindrical chamber, the chamber having an open upper end and a closed lower end; a ball movably disposed in the chamber, the ball having a diameter approximately equal to that of the chamber; an aperture through the closed lower end of the chamber to admit a controlled flow of liquid into the chamber to control the rate of movement of the ball in the chamber; a plurality of ports extending through the housing into the chamber intermediate the upper end and the lower end of the chamber to permit liquid to flow into the chamber; a spout having a cylindrical sleeve with a through bore to allow liquid to flow out of the chamber, the sleeve having a lower end positioned movably and sealingly within the upper end of the chamber and partially obstructing the ports to determine the dispensing volume; a seat for the ball formed in the lower end of the sleeve to prevent liquid from flowing through the bore when the ball is in contact with the seat; a plurality of detents circumferentially spaced around the upper end of the housing at various heights from the ports; means on the spout to engage any one of the detents, whereby the height of the lower end of the sleeve in the chamber is set and the dispensing volume is determined according to the degree to which the ports are obstructed by the lower end of the sleeve; and means to indicate visually the dispensing volume.

BRIEF DESCRIPTION OF THE DRAWING

FIG. 1 is a side elevation of an adjustable pouring dispenser embodying the present invention;

FIG. 2 is a top plan view of FIG. 1;

FIG. 3 is a cross-sectional view taken along the line 3—3 of FIG. 2 with parts removed;

FIG. 4 is a partial isometric view of FIG. 1;

FIG. 5 is a cross-sectional view corresponding to FIG. 3 but shown in an inverted position;

FIG. 6 is a partial side elevation, with parts removed, of the dispenser shown in FIG. 1, showing a port substantially obstructed by a sleeve.

FIG. 7 is a partial side elevation corresponding to FIG. 6, showing the port obstructed to a lesser degree than in FIG. 6.

FIG. 8 is a partial side elevation corresponding to FIG. 6, showing the port obstructed to a lesser degree than in FIG. 7.

DESCRIPTION OF THE PREFERRED EMBODIMENT

Referring to FIGS. 1 and 3, the present invention is embodied in an adjustable pouring dispenser having a plastic housing, designated generally at 10, including a chamber wall 12 defining a cylindrical chamber 14 open at its upper end and closed at its lower end by a bottom surface 16 which has an aperture 18 therein. The housing 10 also includes an integral vent tube 20 open at both ends and disposed parallel to the chamber 14. Longitudinally spaced upper and lower flanges 22 and 24 are formed around the housing 10 below the upper end thereof, and one or more circumferentially spaced ports 26 are formed in the chamber wall 12 below the lower flange 24 to provide fluid communication between the chamber 14 and the exterior of the housing 10.

As shown in FIGS. 2 and 4, the upper end of the chamber wall is defined by a generally helicoid surface 28 having a plurality of equally spaced detents 30 formed therein. The detents 30 having varying heights from the flange 22 as dictated by the varying height of helicoid surface 28. Appropriate indices 32 representing a range of dispensing quantities, such as ½ to 1½ ounces, are formed by molding on the top surface of the upper flange 22 adjacent each detent.

A downwardly facing plastic cap 34 is held in abutting relationship with the bottom of the upper flange 22 by a tubular seal 36 made of a pliable plastic so as to be flexible. The seal 36 has spaced circumferential external ribs 38, and is adapted to fit tightly over and be retained by the lower flange 24 on the housing 10. The seal 36 fits loosely around the chamber wall 12 so as not to obstruct the ports 26.

Within the chamber 14 is disposed a ball 40 having a diameter approximately equal to that of the chamber 14, sufficient radial clearance being provided that the ball 40 may move freely lengthwise in the chamber 14 under its own weight. The ball 40 has a density greater than that of the dispensed liquid so as to be non-buoyant therein and may be made of steel, for example.

A spout 42 has a sleeve 44 and an external radial vane 46. The sleeve 44 has a lower end 52 sized to fit sealingly but movably within the chamber 14 and has a longitudinal through bore 48 with a downwardly flared frusto-conical seat adjacent its lower end 52. A projection 54 extends radically from the sleeve 44 and is adopted to engage one of the detents 30 when the spout sleeve 44 is inserted into the chamber 14.

As shown in FIGS. 6, 7 and 8, the lower end 52 of the sleeve 44 extends into the chamber 14 so as to partially obstruct the ports 26. This obstruction, which presents a throttling resistance to flow through the dispenser, controls the volume of liquid dispensed during each pouring. The sleeve 44 may extend different distances into the chamber 14 according to the height of the particular detent 30 engaged by the projection 54 on the sleeve 44. As the height of the sleeve 44 is changed, the position of the lower end 52 varies accordingly, changing the degree to which the port 26 is obstructed. FIGS. 6, 7 and 8 show the port 26 obstructed to different degrees, the position in FIG. 6 providing a lower flow volume and the position of FIG. 8 producing a higher flow volume. The resistance to flow and consequently the dispensing volume are therefore determined by the height of a particular detent 30, and conversely, each detent 30 corresponds to a given dispensing volume. It is preferred that the detents 30 have progressively varying heights around the upper end of the housing 10 and that the heights be chosen to produce a useful range of dispensing volumes, such as from ½ to 1½ ounces.

In operation, the adjustable pouring dispenser is inserted into the neck of a bottle (not shown) containing a liquid such as whiskey, the ribs 38 of the seal 36 providing a liquid seal and retaining the dispenser on the bottle. When it is desired to pour liquid from the bottle, the bottle and dispenser are inverted, whereupon liquid commences flowing through the ports 26 and out the bore 48 into an appropriate receptacle (not shown). The ball 40, which initially is at a position at the closed end of the chamber 14, begins moving under its own weight toward the open end of the chamber 14, in which is located the lower end 52 of the sleeve 44 and the frustoconical ball seat 50. The descent of the ball 40 toward the seat 50 creates a partial vacuum in the chamber 14 between the ball 40 and the closed end of the chamber 14, which resists the weight of the ball 40. This vacuum is relieved by the metered flow of liquid through the aperture 18 into the chamber 14, and consequently the rate of movement of the ball 40 under its own weight towards the seat 50 is controlled by the aperture 18.

While the ball 40 is descending towards the seat 50, fluid flows out of the bottle through the ports 26 and the bore 48. The ports 26, partially obstructed by the lower end 52 of the spout sleeve 44, offer a throttling resistance in the flow path so that the dispensing volume can be adjusted by moving the lower end 52 of the spout sleeve 44 longitudinally within the chamber 14 to obstruct the ports 26 to a greater or lesser degree as desired.

The flow of liquid through the dispenser is cut off when the ball 40 comes to rest on the seat 50. To dispense another volume of liquid, the bottle must be righted momentarily, allowing the ball 40 to return to its normal position adjacent the closed bottom end of the chamber 14. Thereafter, the pouring cycle can be repeated.

During each pouring, air flows into the bottle through the vent 20 to relieve the vacuum which would otherwise be created therein and would interfere with operation of the pourer.

To adjust the dispensing volume, the spout 42 is grasped, preferably by its vane 46, and is rotated until the vane 46 overlies one of the indices 32 on the flange 22 corresponding to a desired volume. The spout 42 is then pushed toward the housing 10, if necessary, to seat the projection 54 in the corresponding detent 30, the height of which determines how far the lower end 52 of the sleeve 44 extends into the chamber 14, which in turn determines the obstruction of the ports 26 and the dispensing volume as described above.

The pourer delivers substantially equal quantities of liquid during each pouring cycle, eliminating human error. The quantity can be readily changed, if desired, by rotating the spout 42 with respect to the housing 10. The vane and detent construction permits rapid accurate resetting of the pouring quantity with the pourer installed in the bottle, and resists accidental change in the setting during normal use. The vane 46 provides a good handhold for manipulation and acts as an easily read pointer against the indices 30 on the flange, providing improved visibility for use in dimly lit areas.

Inasmuch as the subject invention is subject to many modifications and changes in detail, it is intended that all matter contained in the foregoing description or shown in the accompanying drawing shall be interpreted as illustrative and not in a limiting sense.

What is claimed is:

1. An adjustable pouring dispenser for a liquid container comprising a housing including a cylindrical chamber, said chamber having an open upper end bounded above by a substantially helicoid surface and a closed lower end;

a ball movably disposed in the chamber, said ball having a diameter approximately equal to that of the chamber;

an aperture through the closed lower end of said chamber to admit a controlled flow of liquid into said chamber to control the rate of movement of said ball in said chamber;

a plurality of ports extending through said housing into said chamber intermediate the upper end and the lower end of said chamber to permit liquid to flow into the chamber;

a spout having a cylindrical sleeve with a through bore to allow liquid to flow out of the chamber, said sleeve having a lower end positioned movably and sealingly within the upper end at the chamber and partially obstruction said ports to determine the dispensing volume;

a seat for said ball formed in the lower end of said sleeve to prevent liquid from flowing through said bore when the ball is in contact with the seat;

said helicoid surface having a plurality of detents formed therein at progressively varying heights from said ports;

an integral projection extending radially outward from said sleeve to engage any one of said detents thereby to position said sleeve in said chamber, determining the degree to which the sleeve obstructs the ports and determining a corresponding dispensing volume;

a circumferential flange extending radially outward from said housing between said helicoid surface and said ports;

a plurality of indices representing dispensing volumes ranging from about one-half ounce to about one and one-half ounces formed on the upper surface of said flange, one indicium adjacent each detent; and a vane extending radially outward from said sleeve adjacent said projection and above said flange so as to overlie any one of said indices to indicate a corresponding dispensing volume.

* * * * *

UNITED STATES PATENT OFFICE
CERTIFICATE OF CORRECTION

Patent No. 4,243,157　　　　　　　　　Dated January 6, 1981

Inventor(s) Leonard W. Rettberg

It is certified that error appears in the above-identified patent and that said Letters Patent are hereby corrected as shown below:

On the cover page:

Delete "[73] Assignee: Interproduct B.V., Driebergen, Netherlands".

Delete "Haseltine and Lake" and substitute --O'Brien and Marks--.

Signed and Sealed this

Sixteenth Day of June 1981

[SEAL]

*Attest:*

RENE D. TEGTMEYER

*Attesting Officer*　　　*Acting Commissioner of Patents and Trademarks*